N. H. HOLLAND.
REGISTERING SYSTEM AND APPARATUS.
APPLICATION FILED MAR. 28, 1907.

987,364.

Patented Mar. 21, 1911.
12 SHEETS—SHEET 5.

Witnesses:

Inventor:
Newman H. Holland,
By Bristow Bauner Folk
Attys.

N. H. HOLLAND.
REGISTERING SYSTEM AND APPARATUS.
APPLICATION FILED MAR. 28, 1907.

987,364.

Patented Mar. 21, 1911.
12 SHEETS—SHEET 6.

Witnesses:

Inventor:
Newman H. Holland,
By Barton, Hamner & Folk,
Attys.

N. H. HOLLAND.
REGISTERING SYSTEM AND APPARATUS.
APPLICATION FILED MAR. 28, 1907.

987,364.

Patented Mar. 21, 1911.
12 SHEETS—SHEET 12.

*Fig. 24.*

| TEL. N⁰ | | | |
|---|---|---|---|
| REGISTER READING | | | |
| | | | |

DATE ____________
TEL. N⁰ ____________
DATE ____________
PRESENT READING __
LAST READING ____________
N⁰ OF COINS IN BOX ____________
NAME ____________

TEL. N⁰ M-3765

| B | R | N | S |
|---|---|---|---|

DATE October 1, 1906
TEL. N⁰ M-3765
DATE October 1, 1906
PRESENT READING __
LAST READING __
N⁰ OF COINS IN BOX ____ 1321
NAME John Doe

TEL. N⁰ M 3765
DATE October 1, 1906
PRESENT READING __ 1706
LAST READING ____________
N⁰ OF COINS IN BOX ____ 132
NAME John Doe

TEL. N⁰ M 3765
DATE October 1, 1906
PRESENT READING __ 1706
LAST READING __ 1574
      1321
NO. OF COINS IN BOX  132
NAME John Doe

—67

Witnesses:
Geo Davison
G. Filippi

Inventor:
Newman H. Holland
By Borton, Bonner & Folk
Attys.

UNITED STATES PATENT OFFICE.

NEWMAN H. HOLLAND, OF CHICAGO, ILLINOIS, ASSIGNOR TO WESTERN ELECTRIC COMPANY, OF CHICAGO, ILLINOIS, A CORPORATION OF ILLINOIS.

REGISTERING SYSTEM AND APPARATUS.

987,364.  Specification of Letters Patent.  Patented Mar. 21, 1911.

Application filed March 28, 1907. Serial No. 365,017.

*To all whom it may concern:*

Be it known that I, NEWMAN H. HOLLAND, citizen of the United States, residing at Chicago, in the county of Cook and State of Illinois, have invented a certain new and useful Improvement in Registering Systems and Apparatus, of which the following is a full, clear, concise, and exact description.

My invention relates to a machine for translating a reading in cipher or code representing numerical values into the ordinary decimal system of notation. Its object is to provide mechanism by which a person, even though unfamiliar with the code, may, by manipulation of the machine, record the translation.

A further object of the invention is to prevent the code reading and the translation from appearing together, thus further complicating and rendering impossible any attempt at deciphering the code.

My invention makes possible a system of coin collection somewhat as follows: Each coin actuated mechanism, as, for example, a coin collector at a telephone pay station, is equipped with a counter which gives a code reading, preferably based on a system other than decimal, instead of the usual reading in Arabic numerals. The inspector or collecting agent on his tour would collect the cash and note on a ticket or card the amount thereof, the number of the box and the code reading. The tickets would finally be turned in at the general office and the readings be deciphered by means of the translating mechanism forming the subject matter of the present invention. For example, if a substation register gave a reading of B R N S, said reading would be marked by the collector on the ticket turned in. Let us further assume that under the system of notation which the register operated, each letter of the reading has the following value: B, 1295; R, 307; N, 98; and S, 6. To one familiar with the code the reading B R N S might readily be deciphered by adding the values above given, the translation being 1706. This would necessitate the person or persons doing the deciphering to be acquainted with the code reading, thus rendering possible a leakage of the code to the very persons from whom it is designed that it be kept secret. Moreover, such additions would consume time and be open to other objections. By employing the machine constituting my invention, it is not necessary that the person recording the translation be familiar with the code values. By merely manipulating the keys marked with the secret code a direct reading in the decimal system can be obtained from the statement handed in; for example, by pressing the keys B R N S the figures 1706 will be printed on the ticket. Moreover, said translation is concealed from the operator. As a still further precaution, the stub containing the code reading is severed from the part carrying the translation, and the two deposited in separate receptacles. This latter feature, broadly considered, is the invention of another. The specific mechanism for accomplishing this function forms, however, a part of my invention, and is accordingly claimed herein.

Since the machine is in some cases designed to be used in translating a code or codes the separate characters of which may have a larger value than would read on a single digit, it becomes necessary to provide mechanism by which the actuation of a single key may record such numbers. In the ordinary adding machine, to set down the number 1295, for example, would require the manipulation of one key for each digit. With my machine, the manipulation of the single key B, for instance, would perform this operation.

My invention also provides for changes in the code values, the various keys being readily adjustable to record any desired value for a given character.

These and other features of my invention will be more fully pointed out in the description and claims, and by reference to the accompanying drawings, in which.

Similar letters of reference designate like parts wherever they appear.

Figure 1:
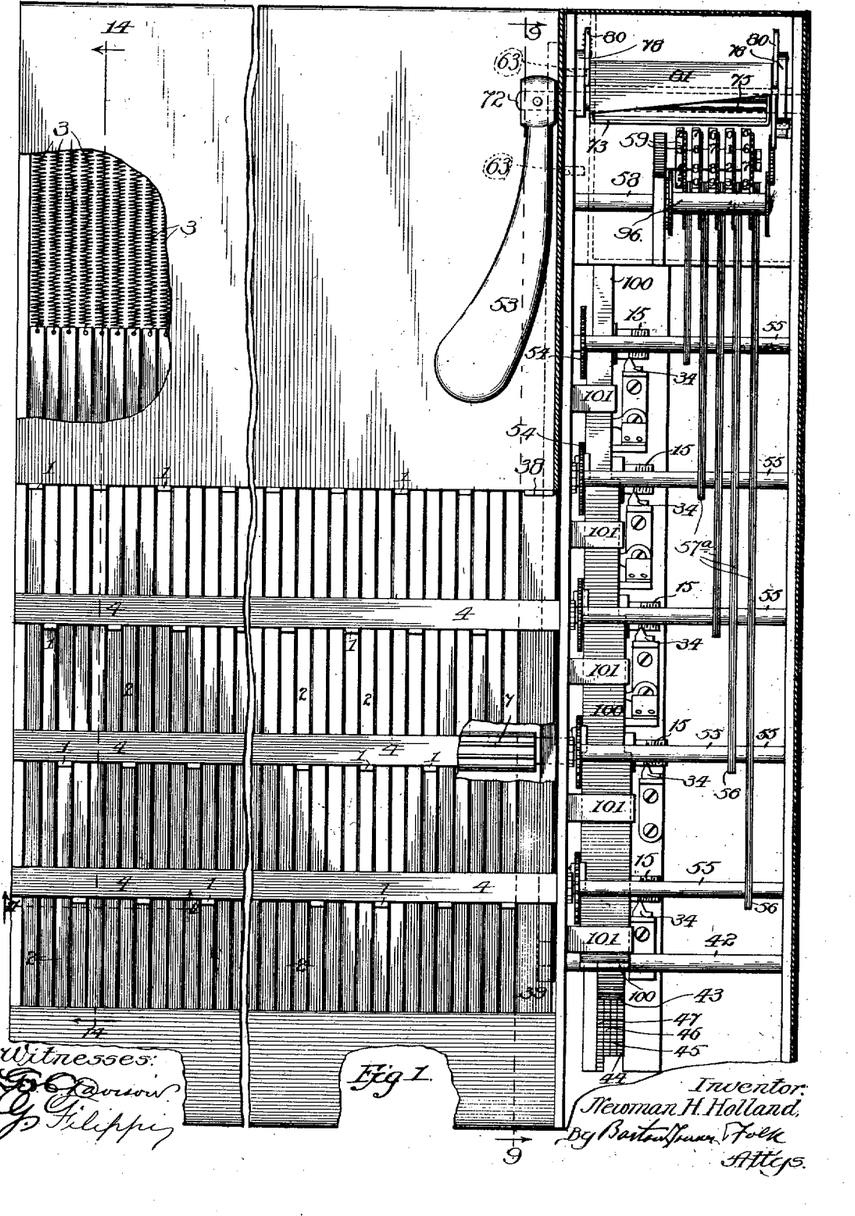
Figure 1 is a plan view of the machine, with parts broken away.
Figure 11:
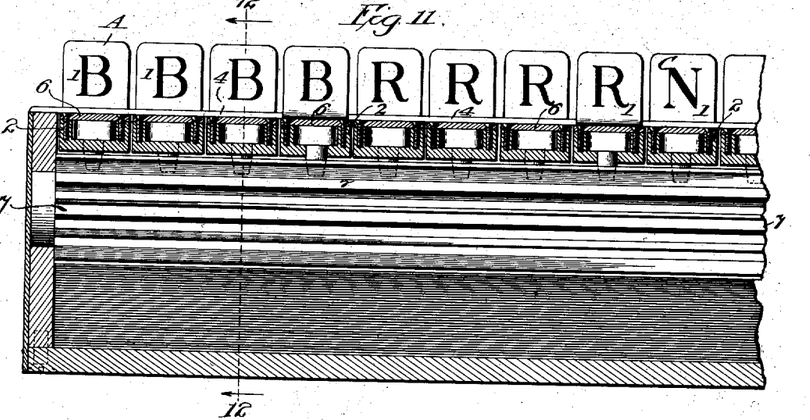
Fig. 11 is an enlarged detail section on the line 11—11 of Fig. 1.

The keyboard, a plan of which is shown in Fig. 1, has on its face a plurality of upstanding keys 1, arranged in groups, extending transversely across the keyboard, the drawings showing four of said groups, the lowermost being the units group, the next succeeding the tens, and so forth. Said keys have characters on their faces corresponding to the code which it is designed to translate, said characters in the present case comprising the letters of the alphabet. The number of groups must be as great as the number of counting wheels employed by the substation register which registered the reading to be translated. Each group will have a key marked to correspond with each character on said counting wheels as shown in Fig. 11. For example, if the substation register had four counting wheels, each carrying the same or a different number of letters, the translating machine of my invention must have four groups, each group having a key for each code character on the counting wheel corresponding to that group.

Figure 12:
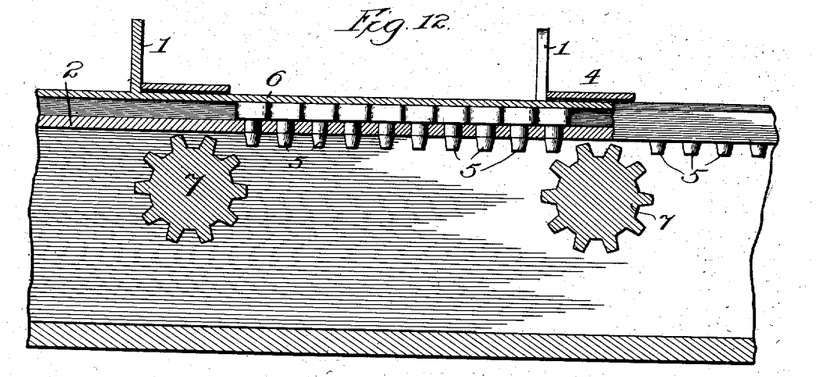
Fig. 12 is a fragmentary sectional view on line 12—12 of Fig. 11.
Figure 13:
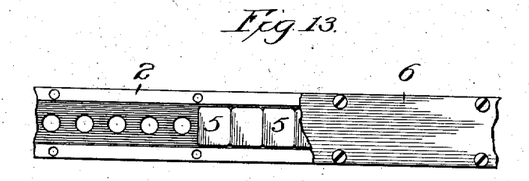
Fig. 13 is a fragmentary plan view of a key bar, showing the removable and adjustable teeth.
Figure 14:
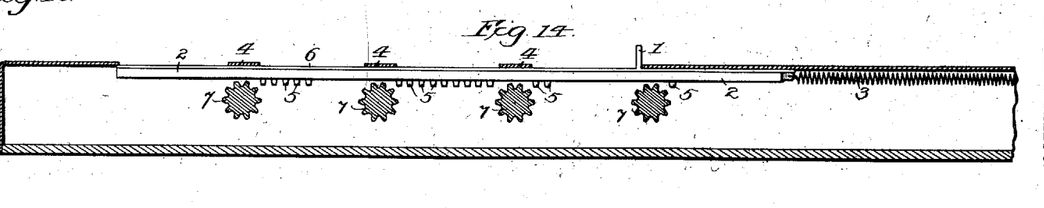
Fig. 14 is a section on the line 14—14 of Fig. 1.
Figures 15, 16, 17:
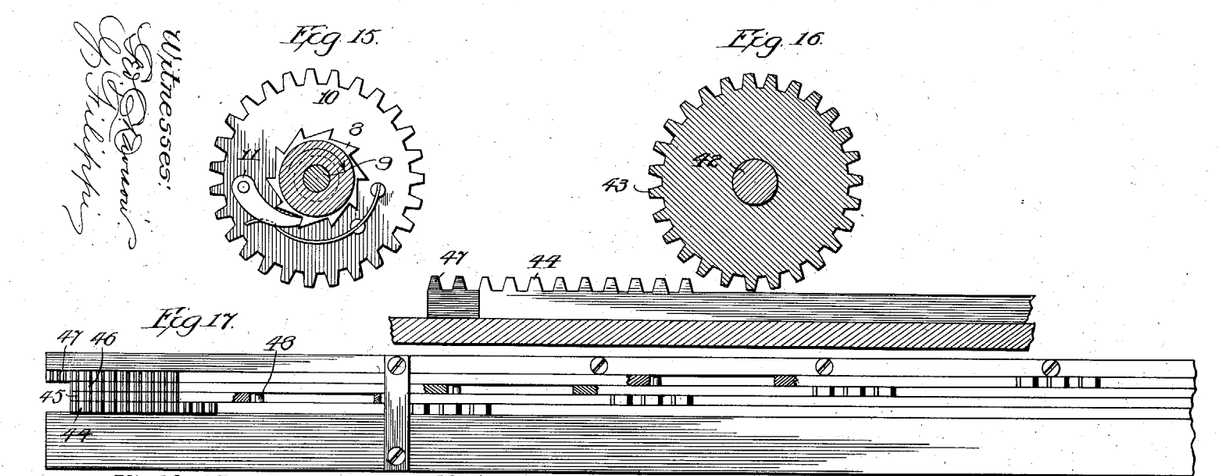
Figs. 15 and 16 are detail sectional views on the lines 15—15 and 16—16 respectively, of Fig. 4.
Fig. 17 is a detail plan view of the rack bars for actuating the storage wheels.
Figure 18:
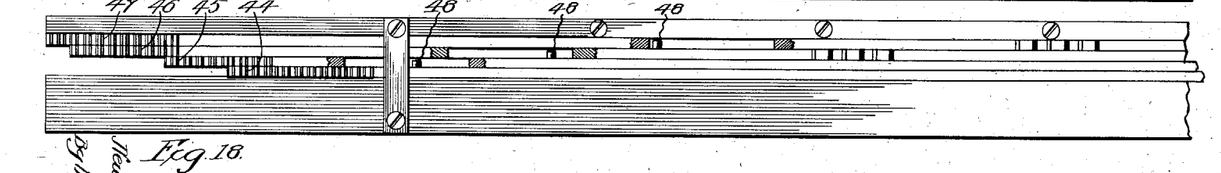
Fig. 18 is a view similar to Fig. 17, showing the successive actuation of the rack bars.

The keys 1 are affixed to reciprocatory key-bars 2, said bars being normally held back by springs 3. The keys are designed to be pulled forward until they contact with the stops 4 extending across the key-board. The structure of the bars may be that shown more fully in Figs. 11, 12 and 13. Each is in the form of a U-shaped channel bar. The bottom of the channel has perforations in which teeth 5 are adjustably affixed, said teeth being held in place by a cover 6 secured over the top of the bar by screws or in any other suitable manner. Said teeth form an adjustable rack on the under side of the bar, to correspond with the code letter, and are adapted to engage one or more of the pinion shafts 7. Said shafts are journaled in bearings in the frame and are arranged below and transverse to the bars 2. Suppose, for example, the code to be deciphered comprises the letters B R N S, having the values hereinbefore assigned them. Since the code letter B in the position indicated has a value of 1295, the bar 2 to which the key 1 containing the letter B in the thousands group, is affixed, will have on its under side one tooth adapted, when said key is drawn forward, to engage the upper or thousands pinion shaft 7 and step it around one notch, two teeth adapted to engage the hundreds pinion shaft, nine teeth adapted to engage the tens pinion shaft, and five teeth adapted to engage the lowermost or units pinion shaft (see Fig. 14). In a similar manner the letter R in the hundreds group, having a value of 307, its key bar will have three teeth adapted to engage the hundreds pinion shaft, and seven teeth adapted to engage the units shaft, with no teeth for engagement with the remaining shafts. As before stated, the teeth 5 are adjustable to provide for changing the code.

Each pinion shaft 7 carries fixed upon its inner end a ratchet wheel 8, which serves to communicate the movement of said shaft 7 to a shaft 9. Each shaft 9 has one end journaled in the corresponding shaft 7 and its other end in the frame of the machine. Fixed upon the end of each shaft 9 adjacent to the ratchet wheel 8 is a driving gear 10. Said gear carries a simple pawl 11, which, when the pinion shaft 7 is rotated by drawing forward of a code key, engages the teeth of the ratchet 8 and rotates the driving gear 10 and the shaft 9 therewith, but which permits the code keys to return to their normal positions without imparting any corresponding motion to the driving wheel or to the shaft 9. The pinion shaft 7 and the ratchet 8 have each ten teeth, the relation between the pinion 7 and the shaft 9 being such that the engagement of one tooth on the key bar 2 with said pinion will give one-tenth of a revolution to said shaft. A helical spring 12 tends to return the shaft 9 to its initial position, but said shaft is held in its rotated or set position by a pawl 13 whch normally engages a ratchet 14 keyed upon said shaft 9. Said spring 12 brings the ratchet wheel 14 to bear upon the pawl 13 and set the shaft and the parts carried thereby against any lost motion.

Each shaft 9 has fixed thereon a collar screw 15. Said collar 15 forms a convenient bearing for a loosely mounted storage or carrying wheel 16, each of said collars except the lowermost one corresponding to the tens keys, being provided with such storage or carrying wheel, the office of which will hereinafter be more fully pointed out.

Keyed upon the collar 15, so as to rotate with the shaft 9, is a ratchet wheel 17. The storage wheel 16 carries a pivoted pawl 18, which is normally spring pressed into engagement with the teeth of the ratchet 17. A spring pressed wheel or roller 19 acts as a keeper on the storage wheel 16, in order that when the shaft 9 is rotated in a contra-clockwise direction by the forward movement of a code key, the pawl 18 will slip over the teeth of the ratchet wheel 17 without movement of said storage wheel.

Mounted to rotate with each shaft 9 is a disk 20, carrying a pin 21. Mounted loosely on the shaft 9 is a lever 22 extending toward the next shaft and meeting an oppositely extending lever 23 loosely mounted on said latter shaft—see particularly Figs. 5 and 6. Said disk and levers act as a tappet to impart an intermittent rotary motion to the storage wheel on said next shaft at each complete revolution of the driving wheel 10 and shaft 9.

Figure 5:
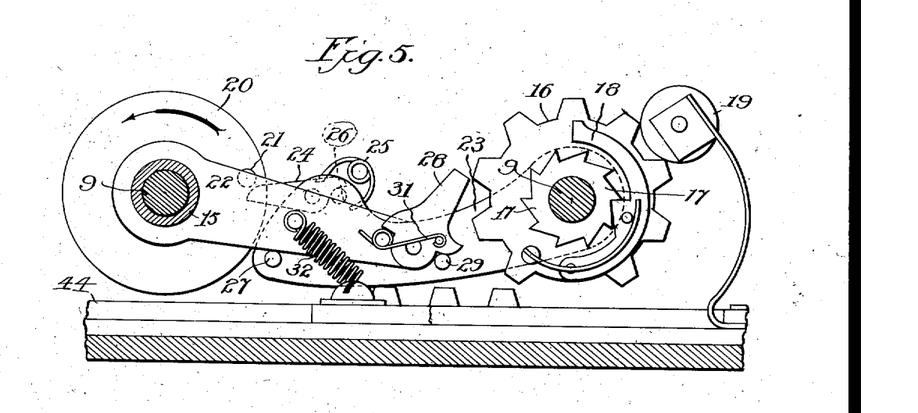
Figs. 5 and 6 are detail views of the carrying or storage mechanism in its normal and actuated positions, respectively.
Figure 6:
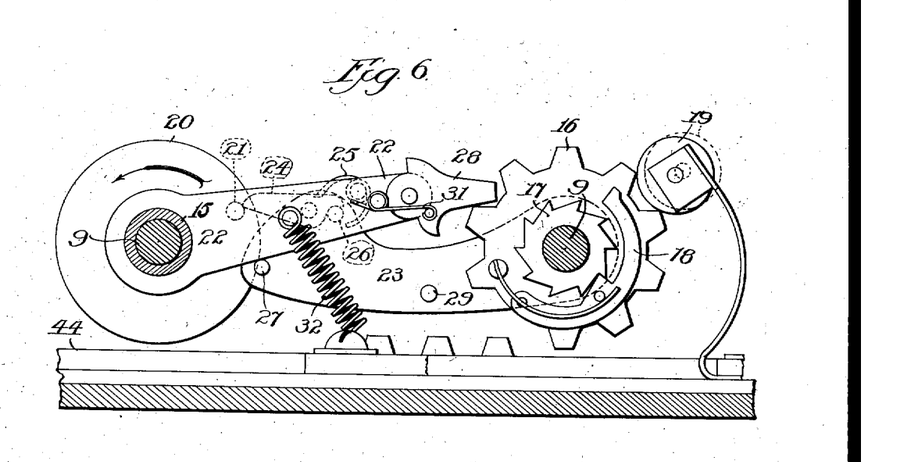
Figure 7:
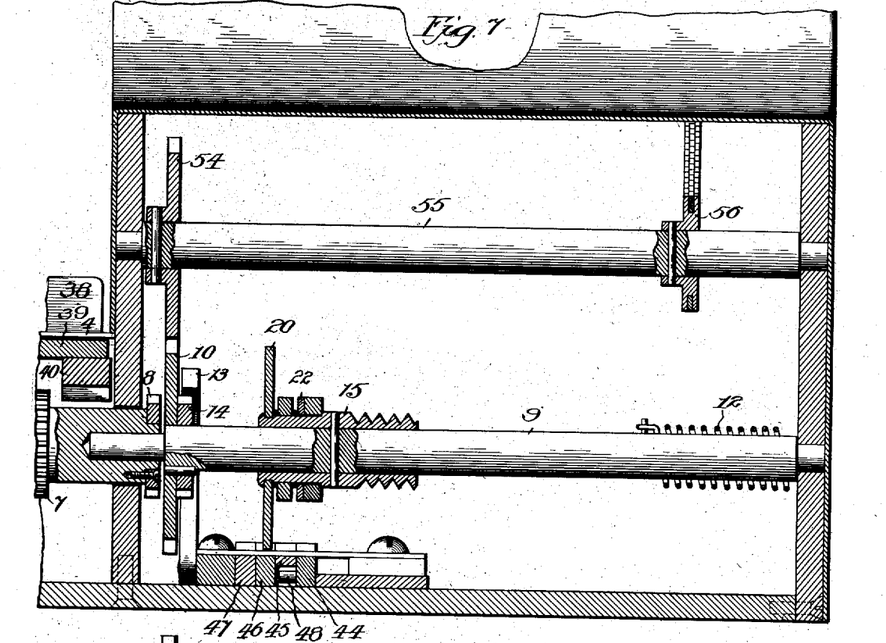
Figs. 7 and 8 are sectional views on the lines 7—7 and 8—8 respectively of Fig. 4.
Figure 8:
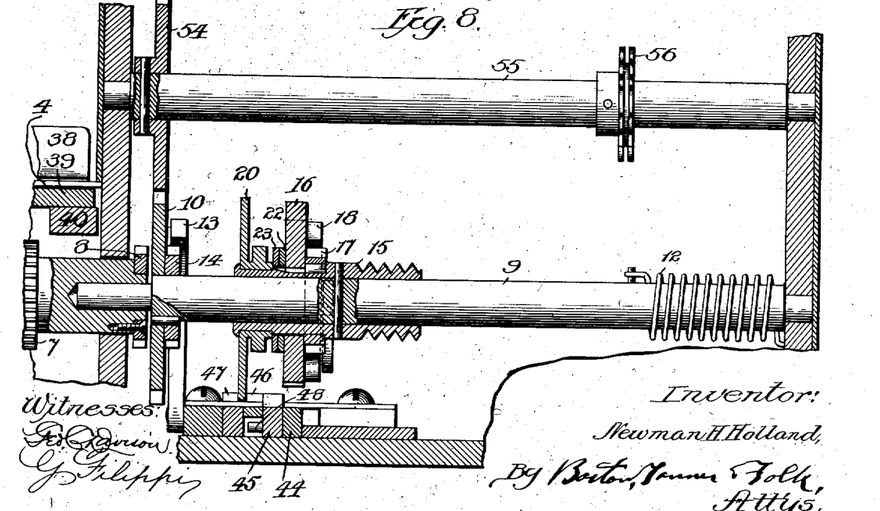

Fig. 5 shows the initial position of the disk 20, the levers 22, 23, and the storage wheel 16. As the shaft 9 is rotated, as previously described, the disk 20 is carried therewith. Projecting in the path of movement of the pin 21 is the tail of a lever 24, which is pivoted upon the lever 23 and has its head pressed by a spring 25 against a pin or stop 26 upon the lever 23. When the disk 20 revolves in a clockwise direction, the spring 25 yields and permits the pin to ride over the lever without disturbing the other parts. However, when the disk is stepped in the direction shown by the arrow in Figs. 5 and 6, the stop 26 prevents the pivotal movement of the lever 24, which is accordingly lifted, carrying with it the lever 23. A pin 27 on said lever 23 thereupon engages the lever 22, thus also lifting said latter lever. In the normal position of the lever 22, the dog 28, pivoted on the end of said lever, is held by a pin 29 on the lever 23, out of engagement with the teeth of the storage or carrying wheel 16. When the lever 22 is raised, the dog 28 is released from the stop 29, whereupon the spring 31 straightens out the toggle formed by the dog 28 and lever 22. Thereupon the free end of the dog 28 engages a tooth upon the storage wheel 16, stepping said wheel around one tooth, or one-tenth of a revolution for each complete revolution of the disk 20. When the pin 21 has passed beyond the lever 24 to its initial position, the spring 32 returns the parts to their normal positions.

Figure 3:
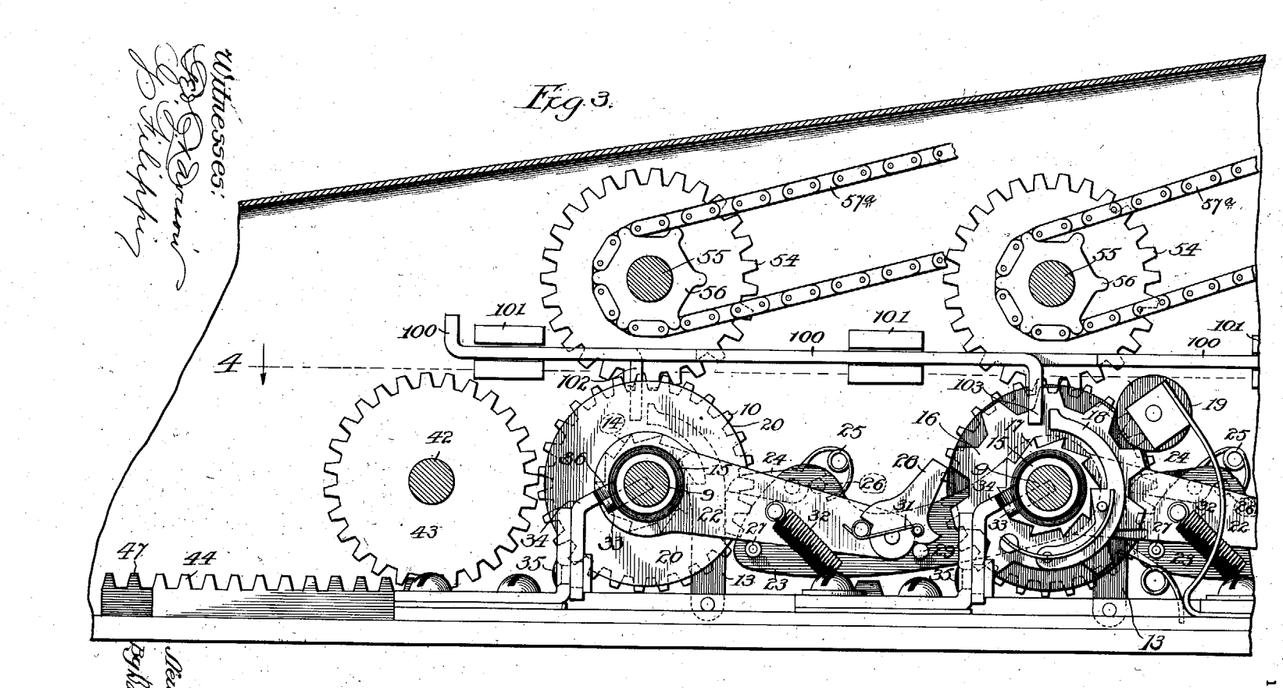
Fig. 3 is an enlarged, fragmentary detail view of parts shown in Fig. 2.
Figure 4:
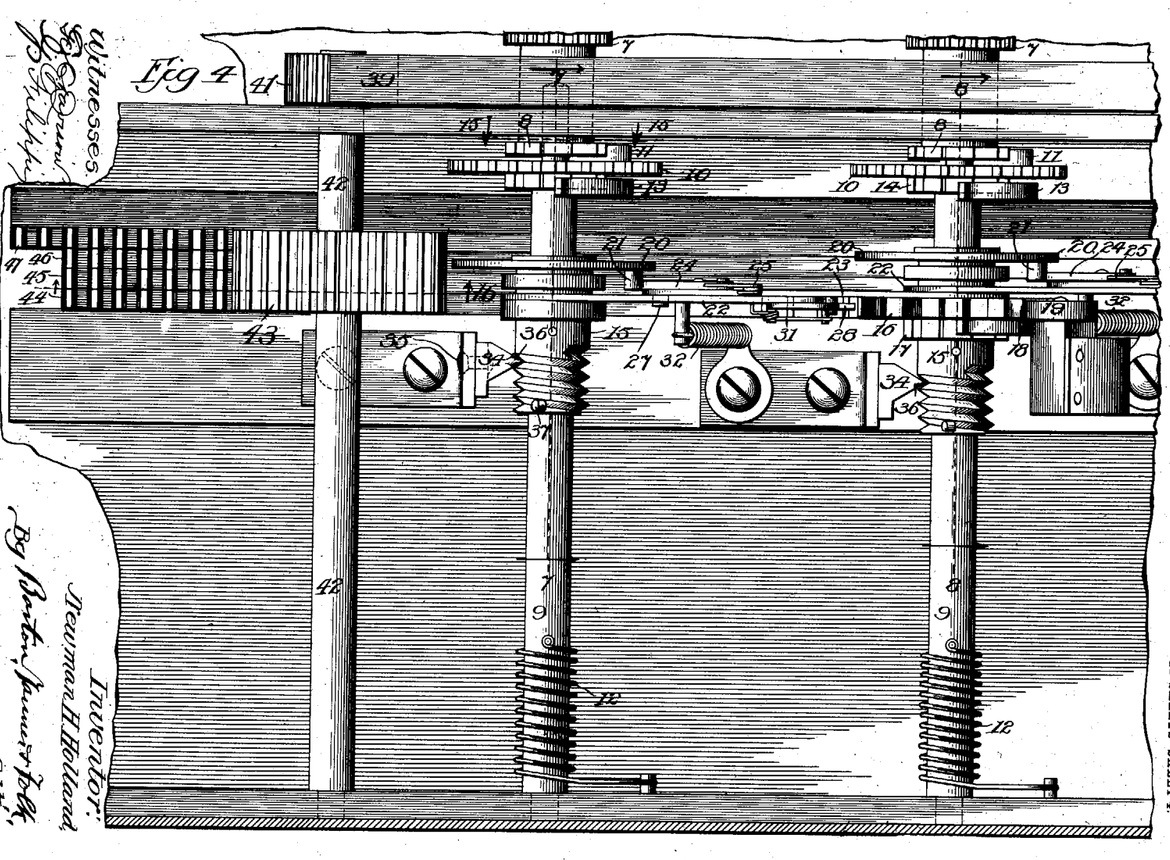
Fig. 4 is a plan sectional view on the line 4—4 of Fig. 3.

Referring more particularly to Figs. 3 and 4, the collar 15 carries a pin 33, which contacts with a stop 34, thus positively stopping and holding the shaft 9 at its initial position when released as will hereinafter be pointed out and returned by the spring 12. The stop 34 is mounted on a pivot 35 and has a point 36 which travels in the groove of the screw collar 15. The stop 34 is thus carried out of the way of the pin 33, permitting of the rotation of the shaft 9, when the code keys are drawn forward, as previously described. In practice it is found that not more than three complete revolutions of the shaft 9 in translating a code will be necessary. Accordingly the collar 15 is merely provided with threads sufficient to permit that number of rotations, before said rotary motion is limited by the extreme travel of the point 36. To prevent the point 36 from escaping from its groove, a pin or stop 37 may be placed in the outer groove, thus limiting the rotation of the shaft 9. Any continued manipulation of the keys which might otherwise free the collar 15 from the point 36 is thus prevented, and the machine in this respect is rendered "fool-proof."

It will be observed that the motion imparted to a storage or carrying wheel 16 by the levers 22, 23, is reverse to that given by the shafts 9 by the operation of the code keys. Furthermore, since said storage wheel is loosely mounted with respect to the shaft 9, its movement in being set is independent of any movement of that shaft 9 upon which it is itself mounted, the pawl 18 during the setting of the storage wheel 16 merely riding over the teeth of the ratchet 17 without imparting any corresponding motion thereto. On the contrary, on the return motion of the storage wheel 16, its pawl 18 engages the teeth of the ratchet 17 and rotates the shaft 9 as many notches as said storage wheel has been moved, and in the same direction as said shaft has been rotated by the key bars 2, thus carrying or adding to the driving wheel 10 the amount stored by the storage wheel 16.

Next in order of description is the means by which the storage wheels are caused to record the amounts carried thereby. The keyboard is equipped with a totals key 38, secured to the key-bar 39, which underlies the stops 4 and extends from the back of the machine to near the front thereof. Beneath the key-bar 39 is secured a rack bar 40 having teeth upon the under side of its front end adapted, when the totals key is drawn forward, to engage a pinion 41. Said pinion is mounted on a shaft 42, which also carries a gear wheel 43. The operation of the totals wheel, therefore, rotates the gear wheel 43, which in turn gives an upward movement to a battery of racks 44, 45, 46 and 47. Said racks are successively engaged by the gear 43, the rack 44 being first engaged and drawn upward until a pin 48 thereon, which extends into a slot in the next rack 45, reaches the end of said slot, whereupon the rack 45 is drawn upward into engagement with the gear 43. In a similar manner the racks 46 and 47 are successively drawn upward.

Each of the racks 44, 45, 46 and 47 is provided with a plurality of teeth adapted to engage the teeth of a corresponding storage wheel 16. As before stated, the lowermost or units shaft 9 is not provided with a storage wheel, the first rack 44 engaging with the storage wheel mounted upon the next or tens shaft. In a similar manner the racks 45 and 46 engage with the teeth upon storage wheels on the hundreds and thousands shafts, respectively. The rack 47 engages with the teeth of a similar storage wheel similarly mounted on a shaft 49 at the upper end of the machine. (See Fig. 2). Since the machine illustrated is designed to permit only three complete revolutions of the shaft 9 in the translation of a code with the consequent stepping of a storage wheel not more than three teeth, it is necessary to provide only three teeth on each of said racks 44, 45, 46 and 47 below its corresponding storage wheel.

Each storage wheel has one or more teeth omitted from its periphery at the bottom, so that in case a storage wheel has not been previously set, or has been returned to its initial position, its corresponding rack will slide beneath the same without engaging any of its teeth. In case a storage wheel has been set by being stopped a certain number of times a corresponding number of its teeth will lie in the path of one of said racks 44, 45, 46 or 47, and said rack will return the storage wheel to its initial position. The pawl 18 on the storage wheel 16 will engage the ratchet 17 fixed on the shaft 9 and transmit the amount carried by a storage wheel to the corresponding driving wheel 10.

The racks 44, 45, 46 and 47 are actuated successively for the same reasons that columns of figures are ordinarily added from right to left. For example, taking the code reading B R N S, with the values previously given, the translation will be 1706, the sum of 1295, 307, 98 and 6. By operating the code keys B, R, N and S, the units shaft 9 has been stepped 5, 7, 8 and 6 steps respectively, or a total of 26 steps, making two complete revolutions and six steps on another. The tens storage or carrying wheel 16 is accordingly stepped two teeth or digits. The tens shaft 9 has been stepped 9 plus 9, or 18 steps, thereby stepping the hundreds storage wheel one tooth or digit. In like manner the hundreds and thousands shafts 9 have been stepped 5 and 1 digits, respectively. When the totals key is operated, the two digits carried by the tens storage wheel are added to the 18 already imparted to the tens driving wheel 10, making a total of twenty, and exactly completing another revolution. Accordingly the hundreds storage wheel is first stepped another digit, making two digits carried thereby; then, through the rack 45, said digits are added to the five already carried by the hundreds driving shaft. The hundreds and thousands digits, having been stepped only 7 and 1 digits, respectively, have not made a complete revolution, and hence have not operated to step the thousands and tens of thousands storage wheels, respectively. The teeth of said latter wheels are, therefore, out of the path of the racks 46 and 47, which racks, consequently, in this particular instance, merely slide beneath said storage wheel without disturbing the same.

Figures 9, 10:
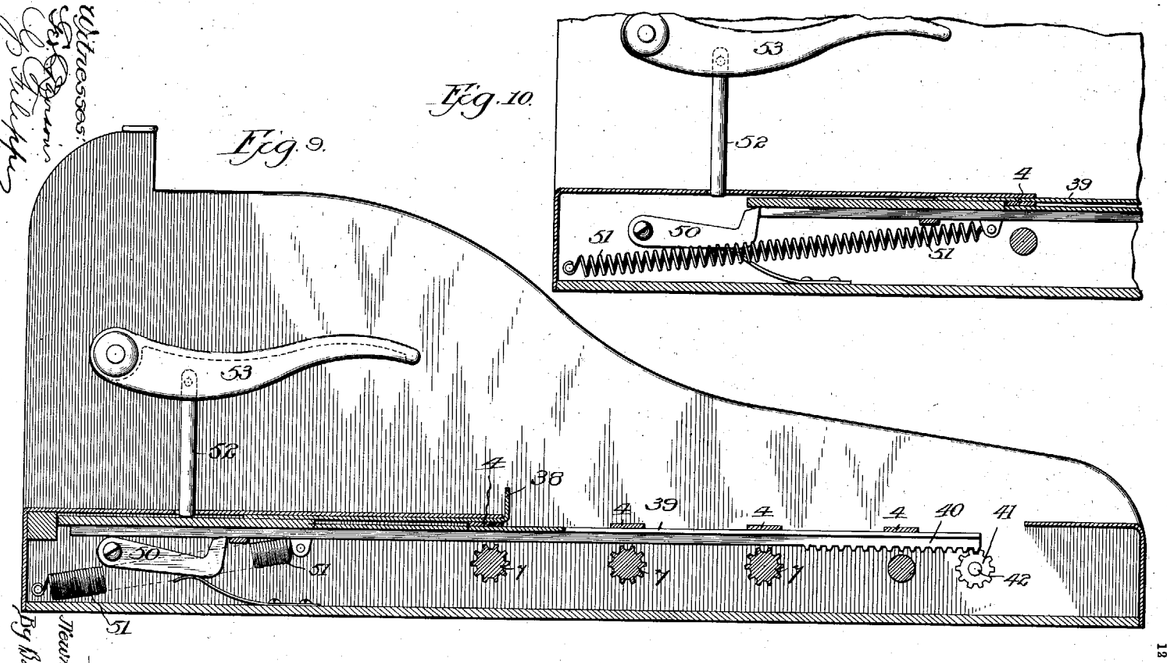
Fig. 9 is a sectional view on the line 9—9 of Fig. 1.
Fig. 10 is a view similar to that shown in Fig. 9, with the totals key pulled forward.

Referring more particularly to Figs. 9 and 10, it will be seen that when the totals key 38 is operated to draw forward the rack bar 40, a spring pressed catch 50 engages the end of the bar 40 and holds it in its advanced position against the retractive tension of the spring 51. This latch is released at the completion of the operation of the machine by a pin 52 carried by the operating lever 53, permitting the spring 51 to return the totals key to its initial position, as will hereinafter be more fully described.

As shown in Figs. 2, 3, 7 and 8, each of the driving wheels 10 engages a corresponding gear 54, mounted on shafts 55, on each of which is also mounted a sprocket wheel 56. Said sprocket wheels are connected to like sprocket wheels 57 by their respective chains 57$^a$. The sprocket wheels 57 are all loosely and independently mounted on a common fixed shaft 58. A plurality of digit wheels 59 are loosely and independently mounted on a common fixed shaft 60. Each digit wheel is made fast to its gear 61, which in turn meshes with the gear 62 likewise made fast to its sprocket wheel 57, each digit wheel 59 thus revolving independent of the others.

Two pins 63 on the rack 40, placed at a proper distance from each other and extending through a slot 64 in the inner wall of the casing, form a bearing for said rack and serve to operate a lever 65. Said lever is pivoted at its upper end on the shaft 58, and carries upon its head a plurality of projections 66, adapted, when the lever 65 is operated by the rear pin 63 at the end of the extreme forward movement of the totals key, to enter notches on the peripheries of the digit wheels 59 between the numbers carried thereon, and thus to hold the digit wheels in their set position during the act of printing the translation of the code.

It will be observed that when the totals key is operated the digit wheels 59 are set so as to register the amount corresponding to the sum of the numbers indicated by the code keys that have been manipulated. Suitable mechanism is provided by which this amount is printed on a card turned in by the collector, the card itself disposed of, and the various parts of the machine returned to their initial or normal positions.

Figure 24:
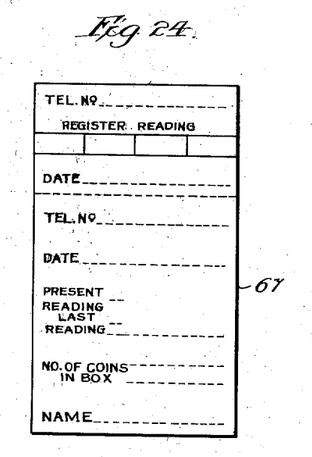
Figs. 24, 25, 26 and 27 are views of the card or ticket as it successively appears.
Figure 25:
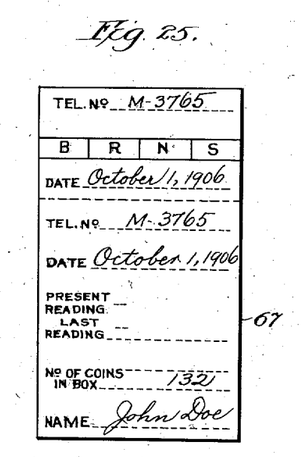

A collector would be supplied each month with a set of cards similar to the card 67 shown in Fig. 24. Each card bears a number corresponding to a station that he has to visit. On collecting the coins from a box he would mark the card, as shown in Fig. 25, with the code numbers borne by the meter at the station. This card and the money collected would be turned in to the proper authorities, and said card would then be placed in the translating machine to have the translation of the code registered thereon at the place indicated.

The casing which incloses the registering disks and conceals the translation is provided with an aperture 68 of a size to receive the card 67. Said card extends through a carrier 69, rests upon a platform 70, and is held in such position that the code letters on the stub thereof are visible through a window 71, as hereinbefore described. The operator then draws forward the code keys corresponding to the code letters displayed and subsequently the totals key. The digit wheels 59 being now set, the lever 53 is depressed, thereby rocking the shaft 72.

The carrier 69 is U-shaped in cross section and is open at each end, the bottom of the U forming a ribbon plate 73 for the type ribbon 74. Said carrier is loosely mounted at its lower end upon the shaft 72. Inside the channel of the carrier 69 is a platen 75. Said platen is loosely pivoted on the shaft 72 and is normally held against a pin or stop 76 by a spring 77. Levers 78, one on each side of the carrier 69, are fixed at their lower ends to the shaft 72, so that they may be rocked by the depression of the operating lever 53. Said levers 78 are normally held back and the lever 53 normally held in its elevated position by springs 79. Pivoted at the upper ends of the levers 78 are levers 80, which carry a knife 81. Said knife is held by the springs 82 against the plate 83, through the opening in which the card 67 extends. A pin 84 in the shaft 72 projects through a hole in the platform 70, so that the platform is reciprocated by the rotation of said shaft. Said platform is supported at its ends in the slots in the partition 90 and the outer casing of the machine.

Figure 26:
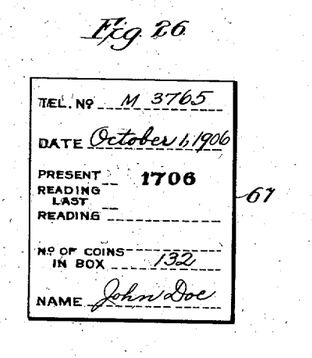
Figure 27:
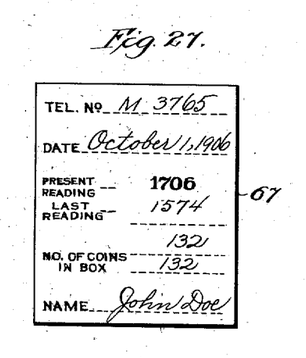

When the lever 53 is depressed the shaft 72 is rotated, thus starting the knife 81 forward and the platform 70 backward. Upon further rotation a pivoted finger 85, under spring tension, engages a pin 86 carried by a backward projection 87 of the platen 75, thus moving the platen forward. A slot is provided in the carrier 69 for the pin 86. The stub of the card 67 containing the code cipher is next severed by the knife and drops down back of the platen into a receptacle 88. The body of the ticket 67 is clamped by the platen 75 against the ribbon plate 73 and said parts then rotated until the type on the digit wheels 59 project through a transverse slot 89 and print the translation on the card, the card so printed being indicated in Fig. 26. A further forward movement of the lever 78 allows the finger 85 to pass underneath the pin 86, whereupon the platen 75 is drawn back by the spring 77, releasing the card 67. The platform 70, upon which the check rested when inserted through the opening 68, is now clear, having been moved back by the pin 84, and the printed card drops into a receptacle 91, said receptacle being separated from the receptacle 88 by a partition 92. The spring 77 returns the platen 75 and the carrier 69 against their respective stops 76 and 93.

Figure 22:
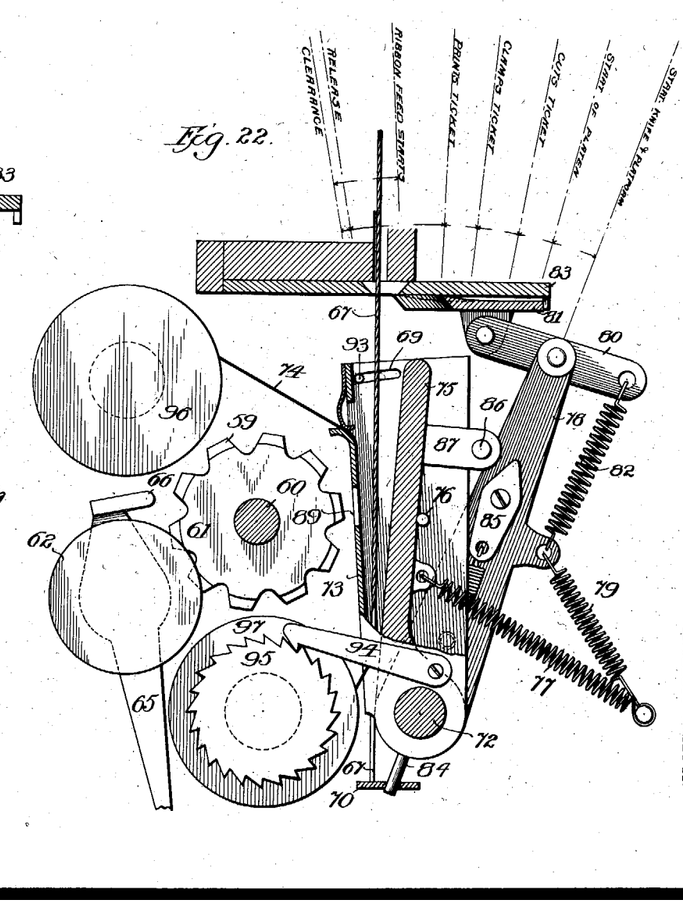
Figs. 22 and 23 are enlarged fragmentary, sectional views of the printing and cutting mechanism in normal and operated positions, respectively.
Figure 23:
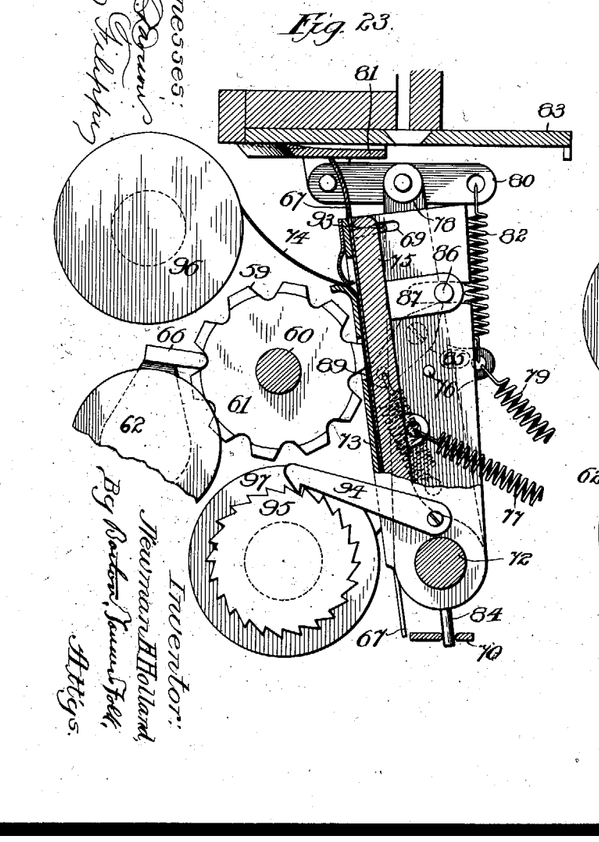

Pivoted to the carrier 69 is a pawl 94 which engages a ratchet wheel 95 and provides a convenient means for automatically feeding the ribbon across the plate 73 from the reel 96 onto the reel 97, in a manner readily understood from Figs. 22 and 23.

At the end of the downward movement of the lever 53, the pin 52 releases the catch 50 from the rack 40. The spring 51 then returns the totals key to its initial position, also restoring the rack bars 44, 45, 46 and 47 by a movement reverse to that previously described. The storage wheels having been returned to their initial positions, said rackbars in their return movement slide beneath said storage wheels without engagement therewith.

Figure 2:
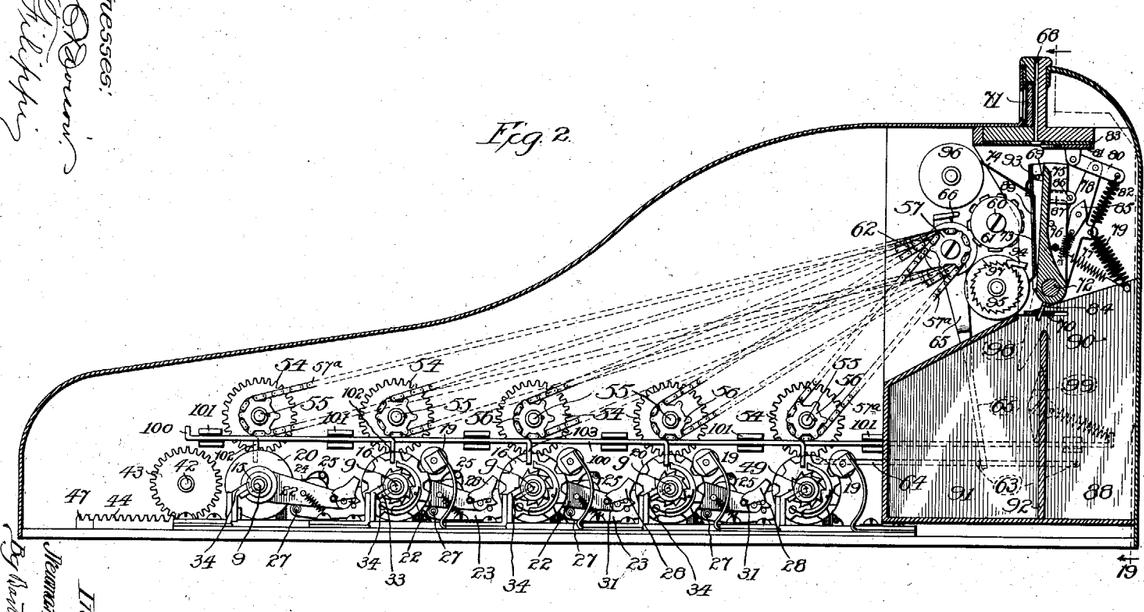
Fig. 2 is a side elevation, partly in section.
Figure 19:
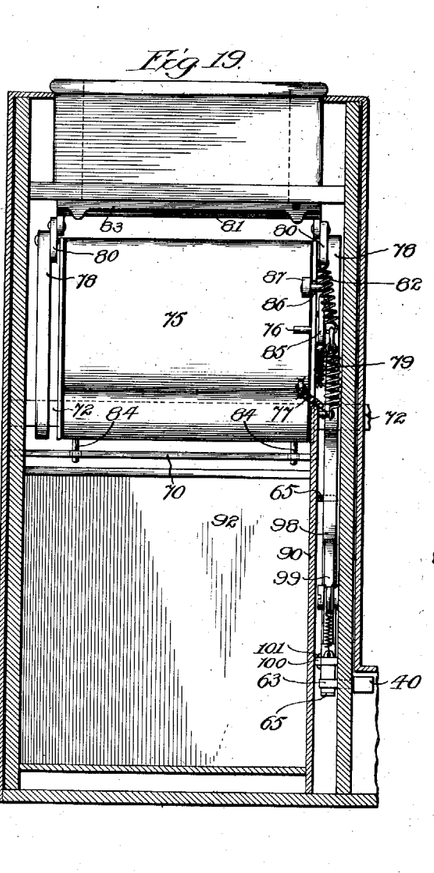
Fig. 19 is a fragmentary sectional elevation on line 19—19 of Fig. 2.
Figures 20, 21:
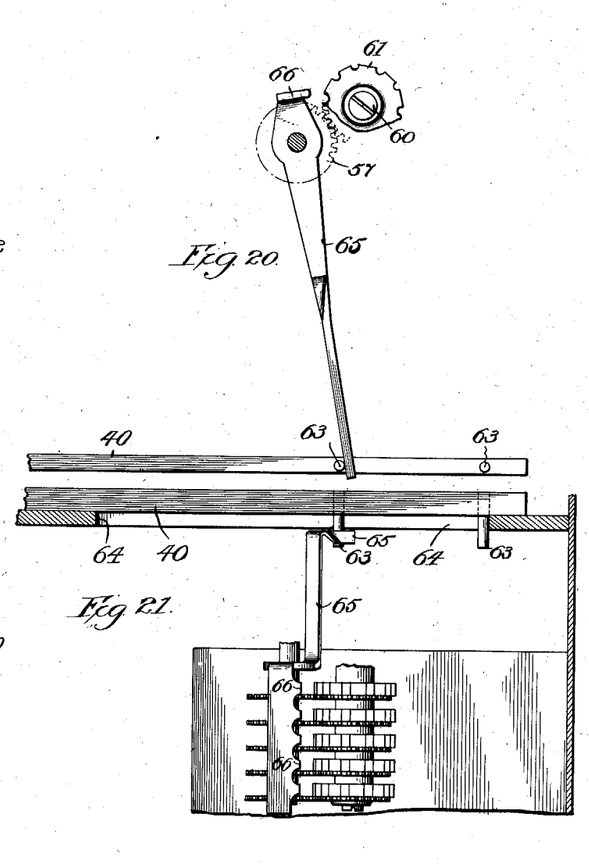
Fig. 20 is a detail view of the mechanism for locking the printing wheels.
Fig. 21 is a plan view of the same.

As shown in Fig. 19, and also by dotted lines in Fig. 2, the inner lever 78 is provided with a downward extension 98. During the forward movement of the lever 78 this extension moves backward, riding over a centrally pivoted vibrating lever 99. When the lever 53 is released, the spring 79 returns the lever 78 and the parts connected therewith to their initial positions. The extension 98 on this return movement engages the lever 99, moving it about its pivot and causing the lower end thereof to engage and operate a compound trigger 100. Said trigger is supported over the pawls 13 and 18 by guides 101, and has depending from its opposite side a series of lugs 102, 103, adapted when the trigger is operated, as just described, to release the pawls 13 and 18, from the ratchet wheels 14 and 17, respectively. The springs 12 thereupon return the shafts 9 to their initial position with the pin 33 resting against the stop 34. Through their gear connection with the driving wheel 10, the digit wheels are at the same time returned to their initial positions, as is readily apparent. All the parts of the machine are now restored to their initial positions ready to repeat the operation described.

Briefly, the operation of the machine is as follows: The operator inserts the card or check in the aperture 68. He then draws forward the code keys 1 corresponding with the code on the check visible through the window 71. For each key drawn forward one or more of the pinion shafts 7 are rotated an amount corresponding to the number of teeth on the key bar 2, each tooth revolving its corresponding pinion one-tenth of a revolution. The rotation of the pinion shaft 7 is communicated by the ratchet 8 and pawl 11 to the driving wheel 10 and the shaft 9 upon which said driving wheel is keyed. Through a system of gears operated from the driving wheel 10 the rotation of said shaft and driving wheel is communicated to the digit wheels 59. Whenever, through the manipulation of the keys 1, the shaft 9 makes a complete revolution, a tappet mechanism (comprising a disk 20 carrying a pin 21 which operates the levers 22 and 23) steps a storage or carrying wheel 16 one-tenth of a revolution, and in a direction reverse to that previously given the shaft 9 on which said storage wheel is loosely mounted. After all the proper code keys for translating the code displayed have been manipulated, a totals key 38 is drawn forward. By a system of gears the several storage wheels are successively operated by the manipulation of said totals key, to return to their original positions and to add to the driving wheels 10 the amounts carried or stored thereon, which amounts are in turn added to the digit wheels 59. The figures representing the translation of the code are now immediately in front of a transverse opening 89 in a ribbon plate 73. The operation of the totals key 38 withdraws a stop from the path of the pin 52 and permits of the operation of the lever 53. By pressing down said lever 53 the ticket is brought into contact with the digits wheel 59 and has the translation printed thereon. Said ticket is also severed into two parts by a knife 81, the stub of the ticket containing the code reading falling into one receptacle, and the body of the ticket bearing the translation into a separate receptacle. At the end of the operation the various parts of the machine will have automatically returned to their initial positions.

Since the upper part or stub of the card bears the code reading and the lower part the translation, it will be noted that a code reading and its translation never appear together except to those who may have access to the receptacles of the translating machine. With the code reading and the translation on the same card, it would be extremely difficult, even with a large number of such readings and translations, to decipher the code. For example, in the code illustrated, the translation of the code reading B R N S, as a whole, is 1706. There is little in this to indicate the value of the several letters taken separately. As an extra precaution, the code reading and the translation are never visible together except when it is necessary to have them compared by one authorized to do so, and hence the opportunities of a leakage of the code are practically eliminated.

I do not wish to limit myself to the details of mechanism shown and described herein. Obviously, such mechanism may be modified in various manners without departing from my invention.

So far as I am aware, I am the first to provide a machine by which a numerical reading in cipher or code can be deciphered and translated into our ordinary decimal or Arabic system of notation.

What I claim is:

1. In a translation machine, the combination with code keys, corresponding to a code representing numerical values, said keys being adjustable to provide for changes in the value of the code letters represented by them, of registering mechanism actuated by said keys for translating a code notation into decimal notation.

2. In a translating machine, the combination with code keys corresponding to a code notation other than decimal, said keys being adjustable to provide for a changeable code, of registering mechanism actuated by said keys for translating said code notation into decimal notation.

3. In combination, a plurality of code keys each provided with one or more groups of actuating parts corresponding to the digits of a number represented by a code key, a series of digit registers arranged to register in decimal notation the values of said code keys, and a series of mechanisms, corresponding to said groups and said digit registers and arranged to be operated by said actuating parts to correspondingly operate the digit registers.

4. In combination, a plurality of code keys each provided with one or more groups of actuating parts corresponding to the digits of a number represented by a code key, a plurality of digit disks arranged to register in decimal notation the values of said code keys, and a series of mechanisms, corresponding to said groups and said disks and arranged to be operated by said actuating parts to correspondingly operate said disks.

5. In combination, a plurality of code keys each provided with one or more groups of actuating parts corresponding to the digits of a number represented by a code key, a series of independently mounted digit registers arranged to register in decimal notation the values of said code keys, and a series of mechanisms, corresponding to said groups and said digit registers, and arranged to be operated by said actuating parts to correspondingly operate the digit registers.

6. In combination, a plurality of code keys each provided with one or more groups of actuating parts corresponding to the digits of a number represented by a code key, a plurality of digit disks arranged to register in decimal notation the values of said code keys, said disks being mounted independent of each other, and a series of mechanisms, corresponding to said groups and said disks and arranged to be operated by said actuating parts to correspondingly operate said disks to register the sum of the numbers represented by the keys operated in a complete operation of the machine.

7. In combination, a plurality of code keys each provided with one or more groups of actuating parts corresponding to the digits of a number represented by a code key, a plurality of digit disks arranged to register in decimal notation the values of said code keys, said disks being mounted to rotate independent of each other, and separate mechanism for stepping each disk, said latter mechanism being arranged to be operated by said actuating parts of the code keys.

8. In combination, a plurality of code keys each provided with one or more groups of actuating parts corresponding to the digits of a number represented by a code key, a plurality of digit disks arranged to register in decimal notation the values of said code keys, said disks being mounted to rotate independent of each other, separate mechanism for stepping each disk, said latter mechanism being arranged to be operated by said actuating parts of the code keys, and storage or carrying mechanism set by one complete operation of a digit disk to step the next succeeding disk one step or digit.

9. In combination, a plurality of code keys each provided with one or more groups of actuating parts corresponding to the digits of a number represented by a code key, a plurality of digit disks arranged to register in decimal notation the values of said code keys, said disks being mounted to rotate independent of each other, separate mechanism for stepping each disk, said latter mechanism being arranged to be operated by said actuating parts of the code keys, storage or carrying mechanism set by one complete operation of a digit disk to step the next succeeding disk one step or digit, a totals key, and mechanism operated thereby for transferring the amounts carried by the storage mechanism to the corresponding digit disks.

10. In combination, a plurality of code keys each provided with one or more groups of actuating parts corresponding to the digits of a number represented by a code key, a plurality of digit disks arranged to register in decimal notation the values of said code keys, said disks being mounted to rotate independent of each other, separate mechanism for stepping each disk, said latter mechanism being arranged to be operated by said actuating parts of the code keys, a series of storage wheels, mechanism operated at each complete revolution of a digit disk to step a corresponding storage wheel one step, a totals key, and mechanism operated thereby for transferring the amounts carried by each storage wheel to the digit disk next higher in notation.

11. In combination, a plurality of key bars, operating keys for said bars marked with the characters of a code representing numerical values, one or more groups of teeth on each bar, the teeth of each group corresponding in number to the corresponding digit of the number represented by a key, registering mechanism, and means controlled by said teeth when a key is operated for actuating said registering mechanism.

12. In combination, a plurality of key bars, operating keys for said bars marked with the characters of a code representing numerical values, one or more groups of teeth on each bar, the teeth of each group corresponding in number to the corresponding digit of the number represented by a key, said teeth being removable and adjustable to provide for a change in the code, registering mechanism, and means controlled by said teeth when a key is operated for actuating said registering mechanism.

13. In combination, a plurality of reciprocating key bars, operating keys for said bars marked with the characters of a code representing numerical values, one or more groups of teeth on each bar, each group representing a digit of the number corresponding to the code key and comprising as many teeth as there are units in that digit, a series of digit disks arranged to register in decimal notation, and a series of mechanisms, corresponding to said groups and said disks, and arranged to be operated by said teeth and thereby in turn to correspondingly set said registering disks.

14. In combination, a plurality of reciprocatory key bars, operating keys for said bars marked with the characters of a code representing numerical values, one or more groups of teeth on each bar, each group representing a digit of the number corresponding to the code key and comprising as many teeth as there are units in that digit, a series of pinions arranged to be rotated by said teeth, one-tenth of a revolution for each engaging tooth, a series of independently rotatable digit disks for registering in decimal notation, and mechanism by which the rotation of said pinions is in turn imparted to its corresponding disk, and mechanism by which for each complete rotation of a pinion, the disk of the next higher digit is stepped one digit number.

15. In a translating machine, a plurality of reciprocatory key-bars, operating keys for said bars marked with the characters of a code representing numerical values, one or more groups of teeth on each bar, each group representing a digit of the number corresponding to the code key and comprising as many teeth as there are units in that digit, a series of pinion shafts arranged to be rotated by said teeth, one-tenth of a revolution for each engaging tooth, a series of driving wheels correspondingly rotated by said shafts, a series of independently rotatable digit disks in turn rotatable by said driving wheels, and mechanism by which for each complete rotation of a driving wheel and its corresponding disk the driving wheel of the next higher digit disk is rotated one-tenth of a revolution, in turn stepping its corresponding disk one digit number.

16. In a translating machine, a plurality of code keys corresponding to a code representing numerical values, registering mechanism actuated by said keys for registering in decimal notation the translation or equivalent of the values represented by a code reading, printing mechanism for recording said translation, and means actuated by said printing mechanism at the completion of its operation for restoring the several parts of the machine to their initial positions.

17. In a translating machine, a plurality of code keys corresponding to a secret code, registering mechanism actuated by said keys for registering the translation of a code reading, a casing concealing the translation so registered, said casing being provided with an aperture through which a ticket having a code reading on its stub is inserted, a pivotally mounted carrier for receiving said ticket, said carrier providing a ribbon carrying plate, a pivotally mounted platen, and operating levers for clamping said ticket between said platen and ribbon plate and for advancing the ticket into printing contact with the numbers set upon said registering mechanism.

18. In a translating machine, a plurality of code keys corresponding to a secret code, registering mechanism actuated by said keys for registering the translation of a code reading, a casing concealing the translation so registered, said casing being provided with an aperture through which a ticket having a code reading on its stub is inserted, a pivotally mounted carrier for receiving said ticket, said carrier providing a ribbon carrying plate, a pivotally mounted platen, operating levers for clamping said ticket between said platen and ribbon plate and for advancing the ticket into printing contact with the numbers set upon said registering mechanism, and restoring mechanism actuated by said levers during their return movement for automatically restoring the several parts of the machine to their initial positions.

19. In a translating machine, a plurality of code keys corresponding to a secret code, registering mechanism actuated by said keys for registering the translation of a code reading, a casing concealing the translation so registered, said casing being provided with an aperture through which a ticket having a code reading on its stub is inserted, a pivotally mounted carrier for receiving said ticket, said carrier providing a ribbon carrying plate, a pivotally mounted platen, operating levers for clamping said ticket between said platen and ribbon plate and for advancing the ticket into printing contact with the numbers set upon said registering mechanism, and a knife operated by the movement of said levers for severing the stub from the body of the ticket.

20. In a translating machine, a plurality of code keys corresponding to a secret code, registering mechanism actuated by said keys for registering the translation of a code reading, a casing concealing the translation so registered, said casing being provided with an aperture through which a ticket having a code reading on its stub is inserted, a pivotally mounted carrier for receiving said ticket, said carrier providing a ribbon carrying plate, a pivotally mounted platen, operating levers for clamping said ticket between said platen and ribbon plate and for advancing the ticket into printing contact with the numbers set upon said registering mechanism, a knife operated by the movement of said levers for severing the stub from the body of the ticket, and separate receptacles into which said parts of the ticket are deposited at the completion of the operation.

In witness whereof, I hereunto subscribe my name this 23rd day of March A. D., 1907.

NEWMAN H. HOLLAND.

Witnesses:
RALPH G. JOHANSEN,
E. F. BEAUBIEN.